US012624496B2

(12) United States Patent
Chung et al.

(10) Patent No.: US 12,624,496 B2
(45) Date of Patent: May 12, 2026

(54) DRYER APPLIANCE USER INTERFACE FOR OPTIMIZING DRYING TIME

(71) Applicant: Haier US Appliance Solutions, Inc., Wilmington, DE (US)

(72) Inventors: MyungGeon Chung, Seoul (KR); Youngmin Han, Gwangju (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 670 days.

(21) Appl. No.: 18/097,756

(22) Filed: Jan. 17, 2023

(65) Prior Publication Data

US 2024/0240385 A1 Jul. 18, 2024

(51) Int. Cl.
| | |
|---|---|
| *D06F 34/06* | (2020.01) |
| *D06F 34/05* | (2020.01) |
| *D06F 34/14* | (2020.01) |
| *D06F 34/18* | (2020.01) |
| *D06F 34/28* | (2020.01) |
| *D06F 34/32* | (2020.01) |
| *D06F 58/36* | (2020.01) |
| *G06V 10/82* | (2022.01) |
| *G06V 20/64* | (2022.01) |
| *D06F 101/14* | (2020.01) |
| *D06F 103/02* | (2020.01) |
| *D06F 105/58* | (2020.01) |

(52) U.S. Cl.
CPC .............. *D06F 58/36* (2020.02); *D06F 34/05* (2020.02); *D06F 34/18* (2020.02); *D06F 34/28* (2020.02); *G06V 10/82* (2022.01); *G06V 20/64* (2022.01); *D06F 2101/14* (2020.02); *D06F 2103/02* (2020.02); *D06F 2105/58* (2020.02)

(58) Field of Classification Search
CPC .......... D06F 34/05; D06F 34/06; D06F 34/14; D06F 34/32; D06F 34/18; D06F 34/28; G06V 20/64; G06V 10/82
USPC ..................... 34/527; 68/12.04, 12.16; 8/137
See application file for complete search history.

(56) References Cited

U.S. PATENT DOCUMENTS

| | | | |
|---|---|---|---|
| 10,563,338 B2 | 2/2020 | Chen et al. | |
| 10,920,356 B2 | 2/2021 | Hatfield et al. | |
| 2014/0352078 A1* | 12/2014 | Leitert ................... | D06F 34/18 8/137 |

(Continued)

FOREIGN PATENT DOCUMENTS

| | | | |
|---|---|---|---|
| CN | 107574625 A | 1/2018 | |
| CN | 110512402 A | 11/2019 | |
| DE | 102012217003 A1 * | 3/2014 | ............. F24C 7/082 |

(Continued)

OTHER PUBLICATIONS

English DE102012217003 by PE2E Sep. 15, 2025.*

*Primary Examiner* — Deming Wan
(74) *Attorney, Agent, or Firm* — Dority & Manning, P.A.

(57) ABSTRACT

A method of operating a dryer appliance includes obtaining an image of a drum of the dryer appliance and a load of articles therein. The image of the drum may be obtained by a remote user interface device. The method further includes detecting a load type of the load of articles in the drum. The load type detected may be based on the image of the drum. The method additionally includes determining a recommended incremental cycle time. The method further includes adjusting a base cycle time with the recommended incremental cycle time.

18 Claims, 6 Drawing Sheets

(56) References Cited

U.S. PATENT DOCUMENTS

2021/0324561 A1    10/2021  Kim et al.

FOREIGN PATENT DOCUMENTS

| WO | WO2014198608 A1 | 12/2014 |
| WO | WO2019095496 A1 | 5/2019 |

* cited by examiner

500

510

UNLOCK THE DRYER APPLIANCE

520

OBTAIN AN IMAGE OF THE DRUM OF THE DRYER APPLIANCE AND A LOAD OF ARTICLES THEREIN

530

DETECT A LOAD TYPE OF THE LOAD OF ARTICLES IN THE DRUM

540

DETERMINE A RECOMMENDED INCREMENTAL CYCLE TIME

550

ADJUST A BASE CYCLE TIME WITH THE RECOMMENDED INCREMENTAL CYCLE TIME

DRYER APPLIANCE USER INTERFACE FOR OPTIMIZING DRYING TIME

FIELD OF THE INVENTION

The present subject matter relates generally to dryer appliances and more particularly to methods of operating a dryer appliance.

BACKGROUND OF THE INVENTION

Dryer appliances generally include a cabinet with a drum rotatably mounted therein. During operation, a motor rotates the drum, e.g., to tumble articles located within a chamber defined by the drum. Dryer appliances also generally include a heater assembly that passes heated air through the chamber in order to dry moisture-laden articles positioned therein.

Conventional user interfaces for a dryer appliance receive inputs from a user that selects a cycle time for a dry cycle of the dryer appliance. Such interfaces, however, rely on the user to provide an input that selects a base cycle time that will dry the load of articles. In some instances, the load type of the load of articles, e.g., the fabric of the articles, will heavily influence the cycle time needed to optimally dry the load of articles. For example, when the load of articles includes articles that hold a lot of moisture, e.g., comforters, towels, thick blankets, etc., a longer cycle time may be needed to optimally dry the load of articles. As another example, when the load of articles includes articles of a material with a high moisture absorptivity, e.g., natural materials such as cotton, a longer cycle time may be needed to optimally dry the load of articles. Conversely, if the load of articles includes articles that do not hold a lot of moisture, e.g., socks, undergarments, shirts, etc., a shorter cycle time may be needed to optimally dry the load of articles. As a further example, a shorter cycle time may be needed to optimally dry the load of articles when the load of articles includes articles of a material with a low moisture absorptivity, e.g., synthetic materials such as in athletic wear. In these instances when the user provides inaccurate information, such as an input that selects an inaccurate load type or a cycle time that is too short, or too long, the results of the dryer cycle may be less than optimal, e.g., the articles may be overheated or excess energy and time may be consumed when the cycle time is too long, or the remaining moisture content in the articles after the cycle may be too high when the cycle time is shorter than optimal.

Thus, it is desired in the art to provide improved interfaces for dryer appliances, such as a user interface which provides information regarding the cycle time of the dry cycle of the dryer appliance, such as information regarding a recommended incremental cycle time to add to the base cycle time selected.

BRIEF DESCRIPTION OF THE INVENTION

Aspects and advantages of the invention will be set forth in part in the following description, or may be apparent from the description, or may be learned through practice of the invention.

In one exemplary embodiment, a method of operating a dryer appliance is provided. The method includes obtaining an image of a drum of the dryer appliance and a load of articles therein. The image may be obtained by a remote user interface device. The method also includes detecting a load type of the load of articles in the drum. The load type detected may be based on the image of the drum of the dryer appliance. The method further includes determining a recommended incremental cycle time. The method also includes adjusting a base cycle time with the recommended incremental cycle time.

In another exemplary embodiment, a method of operating a dryer appliance is provided. The method includes obtaining, by a remote user interface device, an image of a drum of the dryer appliance and a load of articles therein. The method further includes detecting, based on the image, a load type of the load of articles in the drum. The method also includes determining a recommended incremental cycle time to adjust a base cycle time for a dry cycle of the dryer appliance. The method further includes providing a user notification on the remote user interface device in response to the recommended incremental cycle time being determined.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
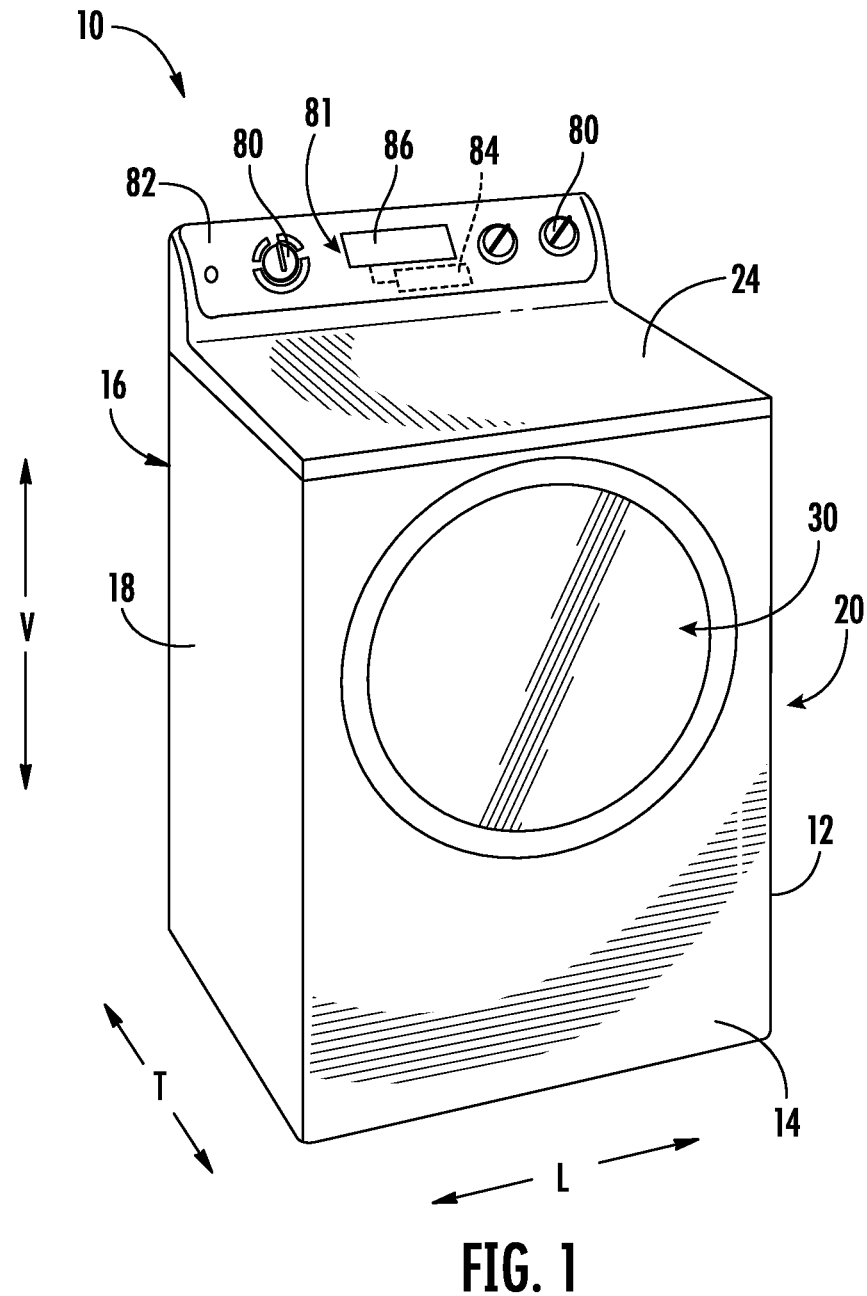
FIG. 1 provides a perspective view of a dryer appliance according to one or more exemplary embodiments of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The word "exemplary" is used herein to mean "serving as an example, instance, or illustration." In addition, references to "an embodiment" or "one embodiment" does not neces- sarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention.

As used herein, the terms "includes" and "including" are intended to be inclusive in a manner similar to the term "comprising." Similarly, the term "or" is generally intended to be inclusive (i.e., "A or B" is intended to mean "A or B or both"). The terms "coupled," "fixed," "attached," and the like refer to both direct coupling, fixing, or attaching, as well as indirect coupling, fixing, or attaching through one or more intermediate components or features, unless otherwise specified herein. The singular forms "a," "an," and "the" include plural references unless the context clearly dictates otherwise. As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As used herein, the terms "clothing," "articles," and the like may include but need not be limited to fabrics, textiles, garments, linens, papers, or other items which may be cleaned, dried, and/or otherwise treated in a laundry appli- ance. Furthermore, the terms "load" or "laundry load" refers to the combination of articles that may be washed together in a washing machine or dried together in a dryer appliance and may include a mixture of different or similar articles of different or similar types and kinds of fabrics, textiles, garments and linens within a particular laundering process.

Figure 2:
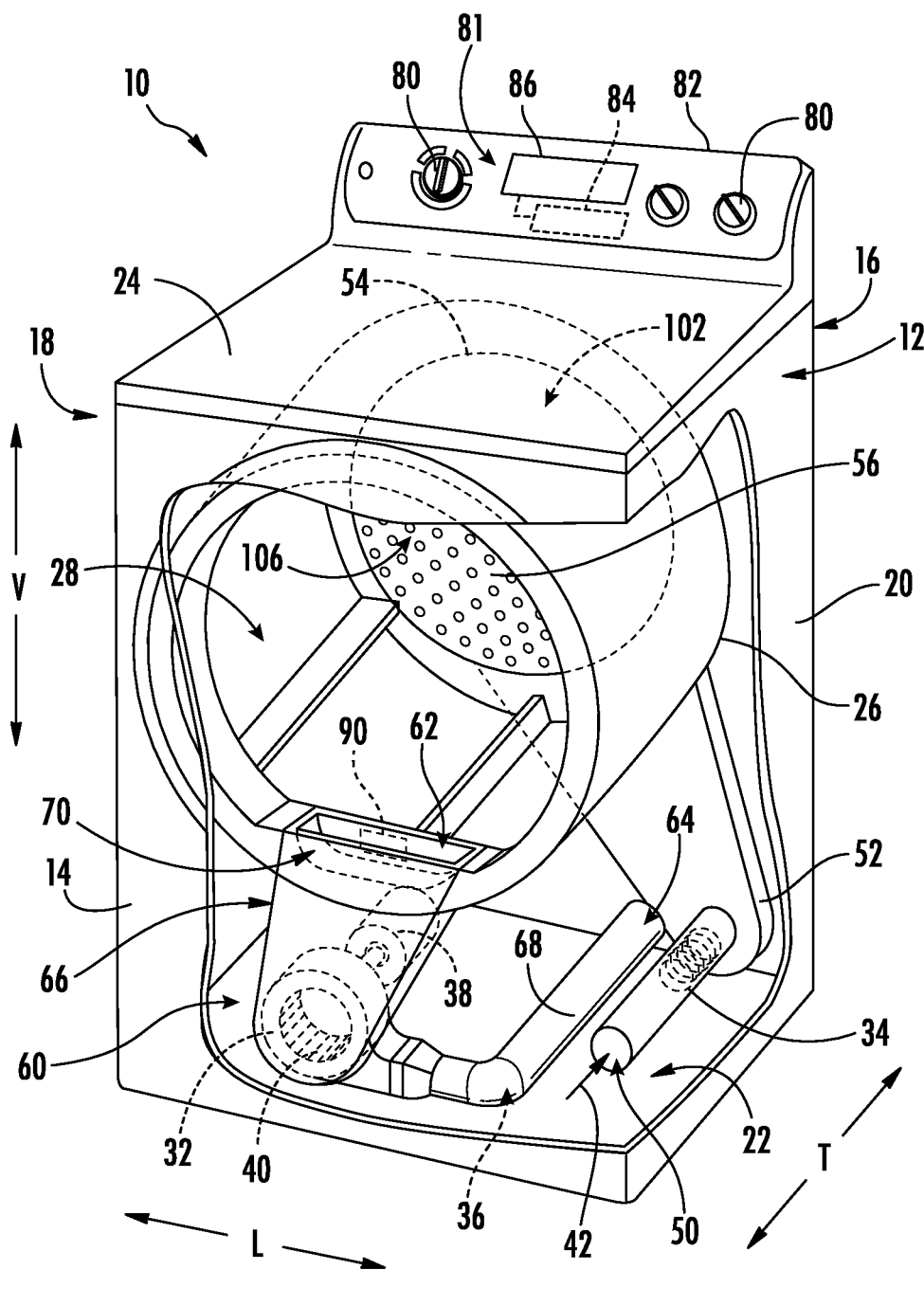
FIG. 2 provides a perspective view of the exemplary dryer appliance of FIG. 1 with portions of a cabinet of the exemplary dryer appliance removed to reveal certain components of the exemplary dryer appliance.

FIG. 1 illustrates a dryer appliance 10 according to an exemplary embodiment of the present subject matter. FIG. 2 provides another perspective view of dryer appliance 10 with a portion of a housing or cabinet 12 of dryer appliance 10 removed in order to show certain components of dryer appliance 10. Dryer appliance 10 defines a vertical direction V, a lateral direction L, and a transverse direction T. The vertical direction V, lateral direction L, and transverse direc- tion T being mutually perpendicular and form an orthogonal direction system. Cabinet 12 includes a front panel 14, a rear panel 16, a pair of side panels 18 and 20 spaced apart from each other by front and rear panels 14 and 16, a bottom panel 22, and a top cover 24. Within cabinet 12 is a container or drum 26 which defines a chamber 28 for receipt of articles, e.g., clothing, linen, etc., for drying. Drum 26 extends between a front portion and a back portion, e.g., along the transverse direction T. In example embodiments, drum 26 is rotatable, e.g., about an axis that is parallel to the transverse direction T, within cabinet 12. A door 30 is rotatably mounted to cabinet 12 for providing selective access to drum 26.

An air handler 32, such as a blower or fan, may be provided to motivate an airflow through an air entrance duct 34 and an air exhaust passage 36 (which is generally defined within trap duct 66, exhaust conduit 68, and dryer discharge port 64). Specifically, air handler 32 may include a motor 38 which may be in mechanical communication with a blower fan 40, such that motor 38 rotates blower fan 40. In this manner, air handler 32 is configured for drawing a flow of air through chamber 28 of drum 26, e.g., in order to dry articles located therein, as discussed in greater detail below. In alternative example embodiments, dryer appliance 10 may include an additional motor (not shown) for rotating fan 40 of air handler 32 independently of drum 26. Furthermore, according to alternative embodiments, air handler 32 may be configured for circulating the flow of air within a recircu- lation loop instead of continuously drawing in fresh air from within cabinet 12 and discharging air through dryer dis- charge port 64.

A control panel 81 including a plurality of input selectors 80 may be provided on a cabinet backsplash 82. Control panel 81 and input selectors 80 collectively form a user interface input for operator selection of machine cycles, e.g., dry cycles, and features. A display 86 of control panel 81 may indicate selected features, operation mode, a count- down timer, and/or other items of interest to appliance users regarding operation.

Operation of dryer appliance 10 is controlled by a pro- cessing device or a controller 84 that is operatively coupled to control panel 81 for user manipulation to select machine cycles and features. In response to user manipulation of control panel 81, controller 84 operates the various compo- nents of dryer appliance 10 to execute selected machine cycles and features. Controller 84 may include a memory and microprocessor, such as a general or special purpose microprocessor operable to execute programming instruc- tions or micro-control code associated with methods described herein. The memory may represent random access memory such as DRAM, or read only memory such as ROM or FLASH. In one embodiment, the processor executes programming instructions stored in memory. The memory may be a separate component from the processor or may be included onboard within the processor. Alternatively, con- troller 84 may be constructed without using a microproces- sor, e.g., using a combination of discrete analog and/or digital logic circuitry (such as switches, amplifiers, integra- tors, comparators, flip-flops, AND gates, and the like) to perform control functionality instead of relying upon soft- ware. Control panel 81 may be in communication with controller 84 via one or more signal lines or shared com- munication busses to provide signals to and/or receive signals from the controller 186.

In addition, the memory or memory devices of the con- troller 84 can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 84 may be operable to execute programming instructions or micro-control code associated with an operating cycle, e.g., dry cycle, of dryer appliance 10. In this regard, the instructions may be software or any set of instructions that when executed by the processing device, cause the processing device to perform operations, such as running one or more software applications, displaying a user interface, receiving user input, processing user input, etc. Moreover, it should be noted that controller 84 as disclosed herein is capable of and may be operable to perform any methods, method steps, or portions of methods as disclosed herein. For example, in some embodiments, methods disclosed herein may be embodied in programming instructions stored in the memory and executed by controller 84.

The memory devices may also store data that can be retrieved, manipulated, created, or stored by the one or more processors or portions of controller 84. The data can include, for instance, data to facilitate performance of methods described herein. The data can be stored locally (e.g., on controller 84) in one or more databases and/or may be split up so that the data is stored in multiple locations. In addition, or alternatively, the one or more database(s) can be connected to controller 84 through any suitable network(s), such as through a high bandwidth local area network (LAN) or wide area network (WAN). In this regard, for example, controller 84 may further include a communication module or interface that may be used to communicate with one or more other component(s) of dryer appliance 10, controller 84, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

While described in the context of a specific embodiment of a dryer appliance, using the teachings disclosed herein it will be understood that dryer appliance 10 is provided by way of example only. Other dryer appliances having different configurations, different appearances, and/or different features may also be utilized with the present subject matter as well. For example, the dryer appliance may be a top load or vertical axis dryer appliance, may have a different configuration and/or location for the user inputs, or may be a closed loop recirculation dryer appliance. As another example, the dryer appliance may also include features for washing articles therein, e.g., the dryer appliance may be a combination washer-dryer appliance.

As will be appreciated, drum 26 may be configured to receive heated air that has been heated by a heating assembly e.g., in order to dry damp articles disposed within chamber 28 of drum 26. The heating assembly may generally include one or more heating elements that are in thermal communication with chamber 28. For instance, the heating elements may include one or more electrical resistance heating elements, gas burners, or induction heating elements for heating air being flowed to chamber 28. As discussed above, during operation of dryer appliance 10, motor 38 rotates fan 40 of air handler 32 such that air handler 32 draws air through chamber 28 of drum 26. In particular, air handler 32 urges ambient air 42 into inlet duct 34 via an entrance 50. Such ambient air 42 is heated by the heating assembly and the resultant flow of heated air is drawn from inlet duct 34, through an intermediate duct 52, and into drum 26. The heated air enters drum 26 through an outlet of intermediate duct 52, otherwise referred to herein as a chamber inlet 54, positioned at a rear wall 56 of drum 26. In this regard, rear wall 56 of drum 26 may define chamber inlet 54 which is in fluid communication with intermediate duct 52. More specifically, according to the illustrated embodiment, chamber inlet 54 comprises a plurality of holes 106 defined in rear wall 56. In this manner, the flow of heated air may pass through inlet duct 34, into intermediate duct 52, and into chamber 28 through holes 106. Although the figures herein illustrate chamber inlet 54 as being a plurality of holes 106 defined in rear wall 56, it should be appreciated that according to alternative embodiments, chamber inlet 54 may be any other suitable passage providing fluid communication between intermediate duct 52 and chamber 28. According to the illustrated exemplary embodiment, rear wall 56 is fixed such that it does not rotate while drum 26 rotates about its central axis.

Within chamber 28, the heated air can remove moisture, e.g., from damp articles disposed within chamber 28. The resultant flow of humid air then flows from chamber 28 through an outlet assembly 60 positioned within cabinet 12. Outlet assembly 60 generally defines air exhaust passage 36 that extends between a chamber outlet 62 and a dryer discharge port 64 defined in rear panel 16 of cabinet 12. Specifically, outlet assembly 60 generally includes a trap duct 66 that extends between chamber outlet 62 and air handler 32, and an exhaust conduit 68 that extends between air handler 32 and dryer discharge port 64. During a dry cycle, the flow of humid air from chamber 28 passes through trap duct 66 to air handler 32 and through exhaust conduit 68 where it is discharged through dryer discharge port 64.

According to exemplary embodiments, an external duct (not shown) is in fluid communication with dryer discharge port 64. For instance, the external duct may be attached (e.g., directly or indirectly attached) to cabinet 12 at rear panel using any suitable connector (e.g., collar, clamp, etc.). In residential environments, the external duct may be in fluid communication with an outdoor environment (e.g., outside of a home or building in which dryer appliance 10 is installed). During a dry cycle, air may thus flow from exhaust conduit 68 and through the external duct before being exhausted to the outdoor environment.

In exemplary embodiments, trap duct 66 may include a filter portion 70 which includes a screen filter or other suitable device for removing lint and other particulates as humid air is drawn out of chamber 28. The humid air is drawn through filter portion 70 by air handler 32 before being passed through exhaust conduit 68. After the clothing articles have been dried (or a drying cycle is otherwise completed), the clothing articles are removed from drum 26, e.g., by accessing chamber 28 by opening door 30. The filter portion 70 may further be removable such that a user may collect and dispose of collected lint between drying cycles.

In some embodiments, dryer appliance 10 also includes one or more sensors that may be used to facilitate improved operation of dryer appliance 10. For example, dryer appliance 10 may include one or more temperature sensors 90. Temperature sensor 90 is generally operable to measure internal temperatures in dryer appliance 10. In some embodiments, temperature sensor 90 is disposed proximal to chamber outlet 62 of drum 26 (e.g., within trap duct 66). In additional or alternative embodiments, a temperature sensor 90 may be disposed within exhaust conduit 68, or otherwise in thermal communication therewith. For example, temperature sensor 90 may extend at least partially within exhaust passage 36 to measure the temperature of air flowing therethrough. In further additional or alternative embodiments, a temperature sensor 90 may be disposed at any other suitable location within dryer appliance 10 to detect the temperature of a flow of air (e.g., downstream from chamber 28). Temperature sensor 90 may be a thermistor, thermocouple, or any other suitable sensor for detecting a specific temperature value of air within appliance 10. When assembled, temperature sensor 90 may be in communication with (e.g., electrically coupled to) controller 84, and may transmit readings to controller 84 as required or desired.

Figure 3:
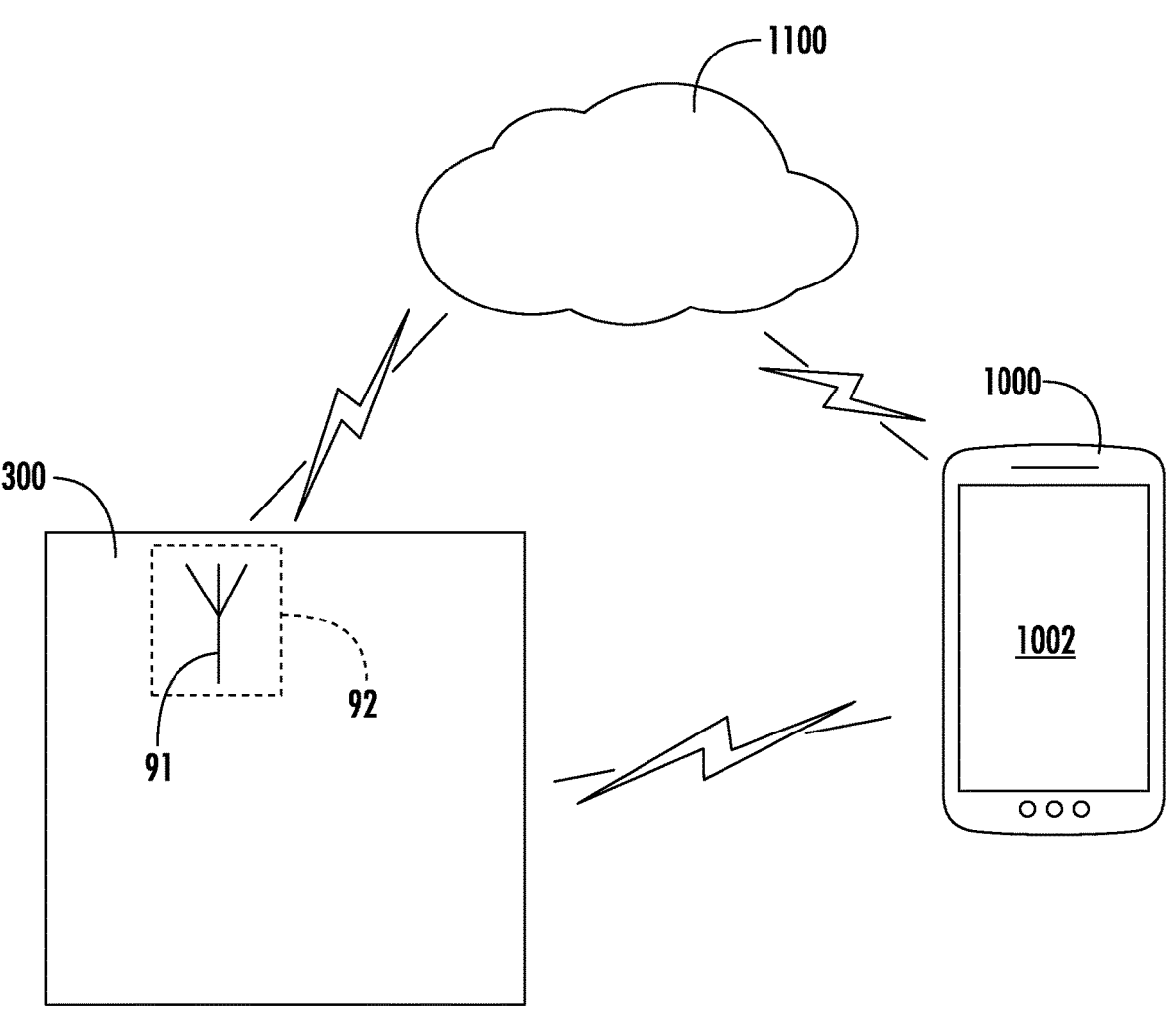
FIG. 3 provides a diagrammatic illustration of a dryer appliance in communication with a remote computing device and with a remote user interface device according to one or more exemplary embodiments of the present subject matter.

Turning now to FIG. 3, a general schematic is provided of a dryer appliance 300, such as but not limited to dryer appliance 10 described above, which communicates wirelessly with a remote user interface device 1000 and a network 1100. For example, as illustrated in FIG. 3, the dryer appliance 300 may include an antenna 91 by which the dryer appliance 300 communicates with, e.g., sends and receives signals to and from, the remote user interface device 1000 and/or network 1100. The antenna 91 may be part of, e.g., onboard, a communications module 92. The communications module 92 may be a wireless communications module operable to connect wirelessly, e.g., over the air, to one or more other devices via any suitable wireless communication protocol. For example, the communications module 92 may be a WI-FI® module, a BLUETOOTH® module, or a combination module providing both WI-FI® and BLUETOOTH® connectivity. The remote user interface device 1000 may be a laptop computer, smartphone, tablet, personal computer, wearable device, smart speaker, smart home system, and/or various other suitable devices. The communications module 92 may be onboard the controller 84 or may be a separate module.

The dryer appliance 300 may be in communication with the remote user interface device 1000 through various possible communication connections and interfaces. The dryer appliance 300 and the remote user interface device 1000 may be matched in wireless communication, e.g., connected to the same wireless network. The dryer appliance 300 may communicate with the remote user interface device 1000 via short-range radio such as BLUETOOTH® or any other suitable wireless network having a layer protocol architecture. As used herein, "short-range" may include ranges less than about ten meters and up to about one hundred meters. For example, the wireless network may be adapted for short-wavelength ultra-high frequency (UHF) communications in a band between 2.4 GHz and 2.485 GHz (e.g., according to the IEEE 802.15.1 standard). In particular, BLUETOOTH® Low Energy, e.g., BLUETOOTH® Version 4.0 or higher, may advantageously provide short-range wireless communication between the dryer appliance 300 and the remote user interface device 1000. For example, BLUETOOTH® Low Energy may advantageously minimize the power consumed by the exemplary methods and devices described herein due to the low power networking protocol of BLUETOOTH® Low Energy.

The remote user interface device 1000 is "remote" at least in that it is spaced apart from and not structurally connected to the dryer appliance 300, e.g., the remote user interface device 1000 is a separate, stand-alone device from the dryer appliance 300 which communicates with the dryer appliance 300 wirelessly. Any suitable device separate from the dryer appliance 300 that is configured to provide and/or receive communications, information, data, or commands from a user may serve as the remote user interface device 1000, such as a smartphone (e.g., as illustrated in FIG. 3), smart watch, personal computer, smart home system, or other similar device. For example, the remote user interface device 1000 may be a smartphone operable to store and run applications, also known as "apps," and some or all of the method steps disclosed herein may be performed by a smartphone app.

The remote user interface device 1000 may include a memory for storing and retrieving programming instructions. Thus, the remote user interface device 1000 may provide a remote user interface which may be an additional user interface to the control panel 81. For example, the remote user interface device 1000 may be a smartphone operable to store and run applications, also known as "apps," and the additional user interface may be provided as a smartphone app.

As mentioned above, the dryer appliance 300 may also be configured to communicate wirelessly with a network 1100. The network 1100 may be, e.g., a cloud-based data storage system including one or more remote computing devices such as remote databases and/or remote servers, which may be collectively referred to as "the cloud." The network 1100 may include, e.g., one or more remote computing devices, such as a remote database, remote server, etc., in a distributed computing environment. Such distributed computing environments may include, for example, cloud computing, fog computing, and/or edge computing. For example, the dryer appliance 300 may communicate with the network 1100 over the Internet, which the dryer appliance 300 may access via WI-FI®, such as from a WI-FI® access point in a user's home, or in a laundromat or dormitory, etc.

The remote user interface device 1000 may be configured to capture and/or display images. For example, the remote user interface device 1000 may be a smartphone, e.g., as illustrated in FIG. 3, which includes both a camera (not shown) for capturing images and a display 1002, e.g., a touchscreen or other screen, for displaying images.

Figure 4:
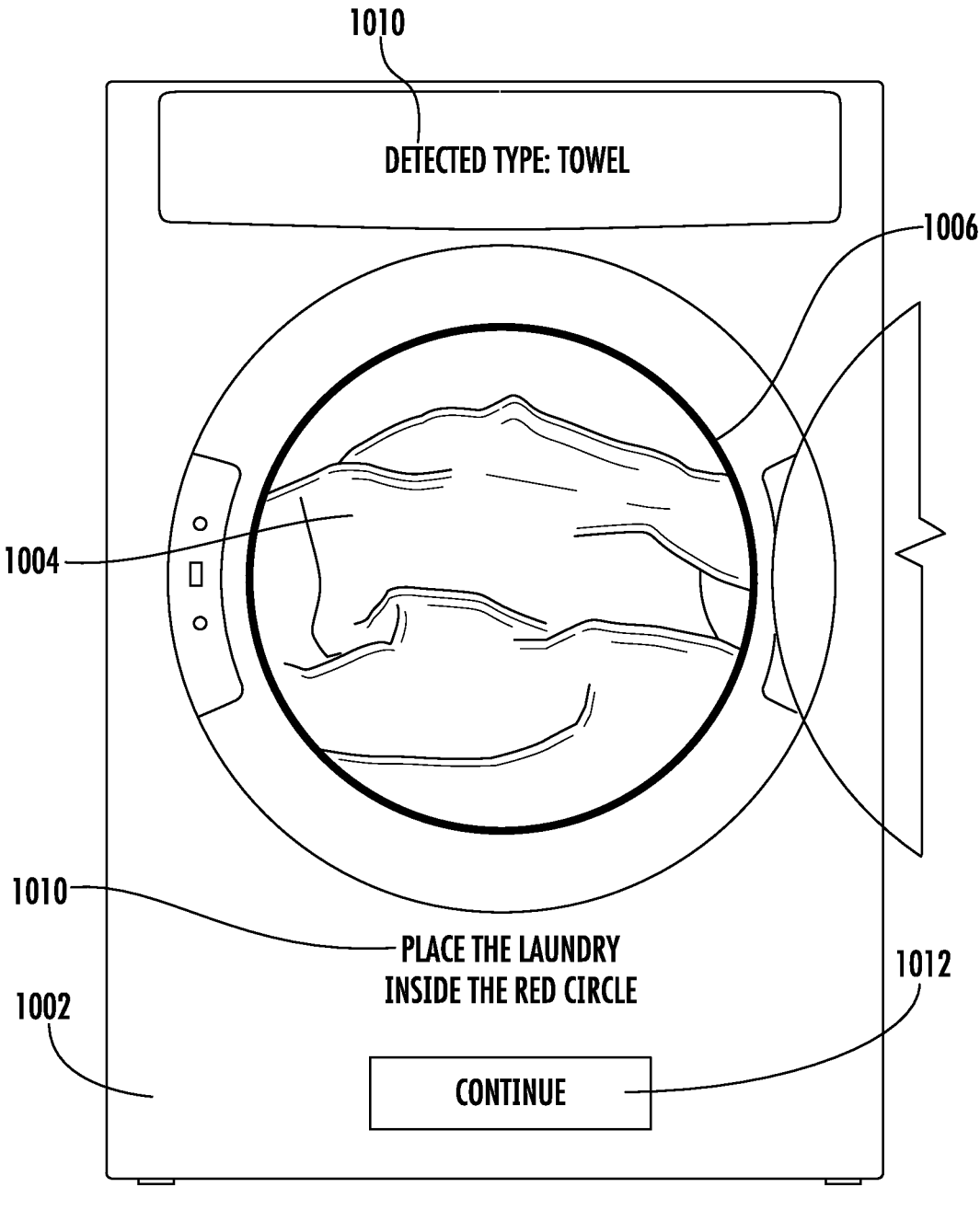
FIG. 4 illustrates an exemplary image which may be displayed on a display of a remote user interface device, where the image includes an image of a dryer appliance, according to one or more exemplary embodiments of the present subject matter.

As will be appreciated, images captured or obtained by the remote user interface device 1000 may include a portion of the drum 26 of the dryer appliance 300 within the frame of the image, e.g., as seen in FIG. 4. For example, the portion of the drum 26 that is captured may be a known or predetermined portion, e.g., based on an angle and distance at which the image is obtained. As will be described in more detail below, in some embodiments, a reticle may be displayed on the remote user interface device 1000. In addition, the reticle may be configured to align with the portion of the drum 26.

The image or images obtained by or with the remote user interface device, e.g., using the camera thereof, such as the example images illustrated in FIG. 4, may be analyzed to determine the type, size, proportion, and/or position of various components of the dryer appliance, such as the drum, the chamber defined by the drum, and/or a load of articles positioned in the chamber. In some embodiments, the analysis may be based at least in part on the one or more images, e.g., based on an image processing algorithm and a machine learning image recognition process. Each of these image evaluation processes will be described below according to exemplary embodiments of the present subject matter. It should be appreciated that image processing and machine learning image recognition processes may be used together to provide an extra safety factor and redundant detection methods to improve the accuracy of detecting the size, proportion, and/or position of the selected components of interest. In some exemplary embodiments, such redundant or duplicative detection methods may be desirable to improve the likelihood of accurate detection.

As used herein, the term "image processing algorithm" and the like is generally intended to refer to any suitable methods or algorithms for analyzing images of drum 26 and/or a load of articles therein that do not rely on artificial intelligence or machine learning techniques (e.g., in contrast to the machine learning image recognition process as described below). For example, the image processing algorithm may rely on image differentiation, e.g., such as a pixel-by-pixel comparison of two sequential images. Image differentiation may be used to, for example, determine if a position, location, or geometric property, e.g., shape, area, or dimension, etc., of a component changes, such as crosses a threshold, e.g., a minimum or maximum, such as a minimum or maximum load size of a load of articles in the chamber 28.

Additional embodiments may also include using a machine learning image recognition process instead of or in addition to an image processing algorithm. In this regard, the images obtained by the camera may be analyzed by controller 84. In addition, it should be appreciated that this image analysis or processing may be performed locally, e.g., by controller 84, or remotely, such as by using distributed computing, a digital cloud, or a remote server, such as in a cloud computing system or other distributed computing environment, e.g., edge computing or fog computing. According to exemplary embodiments of the present subject matter, the images obtained with the camera may be analyzed using a neural network classification module and/or a machine learning image recognition process. In this regard, for example, controller 84 may be programmed to implement the machine learning image recognition process that includes a neural network trained with a plurality of images, such as images of clothing or articles and/or images of the drum 26, and/or controller 84 may communicate with a remote server (such as in the cloud, etc., as mentioned) where the remote server implements all or a portion of the machine learning image recognition process.

As used herein, the terms image recognition process and similar terms may be used generally to refer to any suitable method of observation, analysis, image decomposition, feature extraction, image classification, etc. of one or more images or videos taken of a chamber of a dryer appliance, such as images or videos of areas, volumes, and/or regions within and/or around the chamber. In this regard, the image recognition process may use any suitable artificial intelligence (AI) technique, for example, any suitable machine learning technique, or for example, any suitable deep learning technique. It should be appreciated that any suitable image recognition software or process may be used to analyze images taken by the camera, and that controller 84 may be programmed to perform such processes and take corrective action or other responsive actions.

According to an exemplary embodiment, controller 84 may implement a form of image recognition called region-based convolutional neural network ("R-CNN") image recognition. Generally speaking, R-CNN may include taking an input image and extracting region proposals that include a potential object, such as a particular garment, a region of a load of clothes, or the size or position of the agitation element. In this regard, a "region proposal" may be regions in an image that could belong to a particular object, such as a load of articles in the chamber 28. A convolutional neural network is then used to compute features from the region proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like.

According to still other embodiments, the image recognition process may use any other suitable neural network process. For example, the image recognition process may include using Mask R-CNN instead of a regular R-CNN architecture. In this regard, Mask R-CNN is based on Fast R-CNN which is slightly different from R-CNN. In addition, a K-means algorithm may be used. Other image recognition processes are possible and within the scope of the present subject matter.

It should be appreciated that any other suitable image recognition process may be used while remaining within the scope of the present subject matter. For example, the image or images from the camera (e.g., the camera of a remote user interface device, as noted above) may be analyzed using a deep belief network ("DBN") image recognition process. A DBN image recognition process may generally include stacking many individual unsupervised networks that use each network's hidden layer as the input for the next layer. According to still other embodiments, the image or images may be analyzed by the implementation of a deep neural network ("DNN") image recognition process, which generally includes the use of a neural network (computing systems inspired by biological neural networks) with multiple layers between input and output. Other suitable image recognition processes, neural network processes, artificial intelligence ("AI") analysis techniques, and combinations of the above described or other known methods may be used while remaining within the scope of the present subject matter.

In some embodiments, an overlay may be developed from such image analysis or processing, whereby the overlay may correspond to positions or alignments of components of the dryer appliance, contents within the chamber, or other objects in and/or around the dryer appliance. For example, the image analysis or processing may include recognizing, determining, and/or estimating the volume of the drum of the dryer appliance from the image. As another example, the image analysis or processing may also or instead include recognizing, determining, and/or estimating a load type of a load of articles in the drum. In additional exemplary embodiments, one or more other components or aspects of the dryer appliance may be recognized or otherwise analyzed from the obtained image as well as or instead of the drum volume and/or type of articles.

Turning now specifically to FIG. 4, an image, such as a live image of the dryer appliance which may be captured, e.g., by a camera of a remote user interface device, and which may be displayed, e.g., live or in real-time or near real time, on such display 1002 of the remote user interface device 1000, is provided. It should be appreciated that a "live image" as used herein is intended to include images which are continuously updated in real time or with some delay and which may be updated at least about once per second, e.g., which have a refresh rate of 1 Hz or greater. The display 1002 may generate, reproduce, and/or otherwise display a static image or a dynamic (e.g., animated or updated) image, which may be or include an image of a dryer appliance, such as the exemplary dryer appliance 300 or 10 described above, obtained by a camera of the remote user interface device. In other embodiments, the image may be a still image or a series of still images, such as a chronological series of images, e.g., taken one or more seconds apart at generally regular intervals. For example, the image, e.g., live image or series of still images, may reflect addition or removal or rearrangement of articles within the chamber, e.g., chamber 28 of FIGS. 1 and 2.

The image provided on the display 1002 of the remote user interface device 1000 may be a composite or synthesized image, e.g., the image may include additional elements as well as the image obtained by the camera, such as a graphical overlay, a text overlay, or a combined overlay including both graphical elements and text elements. For example, such elements may include text elements 1010, where the text elements 1010 on the display 1002 may include explanatory text or instructions, e.g., pertaining to one or more operating parameters of the dryer appliance, such as a detected type, e.g., detected load type, of the load of articles. Also by way of example, the overlay may include user interface elements, e.g., interactive elements, such as a control or input 1012.

An image such as one of the images illustrated in FIG. 4 may be a live image and may be used to guide a user in obtaining a still image of the dryer appliance and the load of articles 1004 therein. In some embodiments, the resultant still image may be analyzed, e.g., by using a neural network classification module and/or machine learning image recognition process, such as described above, to determine a load type of a load of articles. For example, the resultant image may be analyzed using an R-CNN module to determine a fabric type of the articles in the load of articles. As will be appreciated, this analysis may be used to determine a cycle time for a dry cycle that may optimally dry the load of articles within the chamber of the dryer appliance. Additionally, in some instances, this analysis may be used to determine a recommended incremental cycle time to add to a base cycle time, e.g., a cycle time selected by a user, such as by input selector 80.

Moreover, such guidance may include a fiducial marker or target, such as a reticle 1006, which is configured to align (on-screen, e.g., in the image provided on the display 1002) with the dryer appliance, such as with a portion thereof, such as with an opening into the drum 26. The reticle 1006 may be a circle, e.g., as illustrated in FIG. 4, or other suitable shape generally corresponding to one or more components (or portions or segments thereof) of the dryer appliance with which the reticle is configured to align.

As will be appreciated, some exemplary methods according to the present disclosure may include displaying, on a display of the remote user interface device, a reticle configured to align with the dryer appliance, such as with the opening into the drum 26. In such embodiments, displaying the reticle may include overlaying the reticle on a live image of the dryer appliance. Such methods may also include obtaining the image, e.g., still image, while the reticle is aligned with the chamber in the live image on the display of the remote user interface device. Such alignment may serve to promote consistency and accuracy in image processing and image analysis performed on the resultant image, e.g., by ensuring that the image to be analyzed is captured at a known distance from the dryer appliance and a known angle to the dryer appliance, or within an acceptable tolerance, such as plus or minus ten percent or ten degrees, of the known distance and angle.

Figure 5:
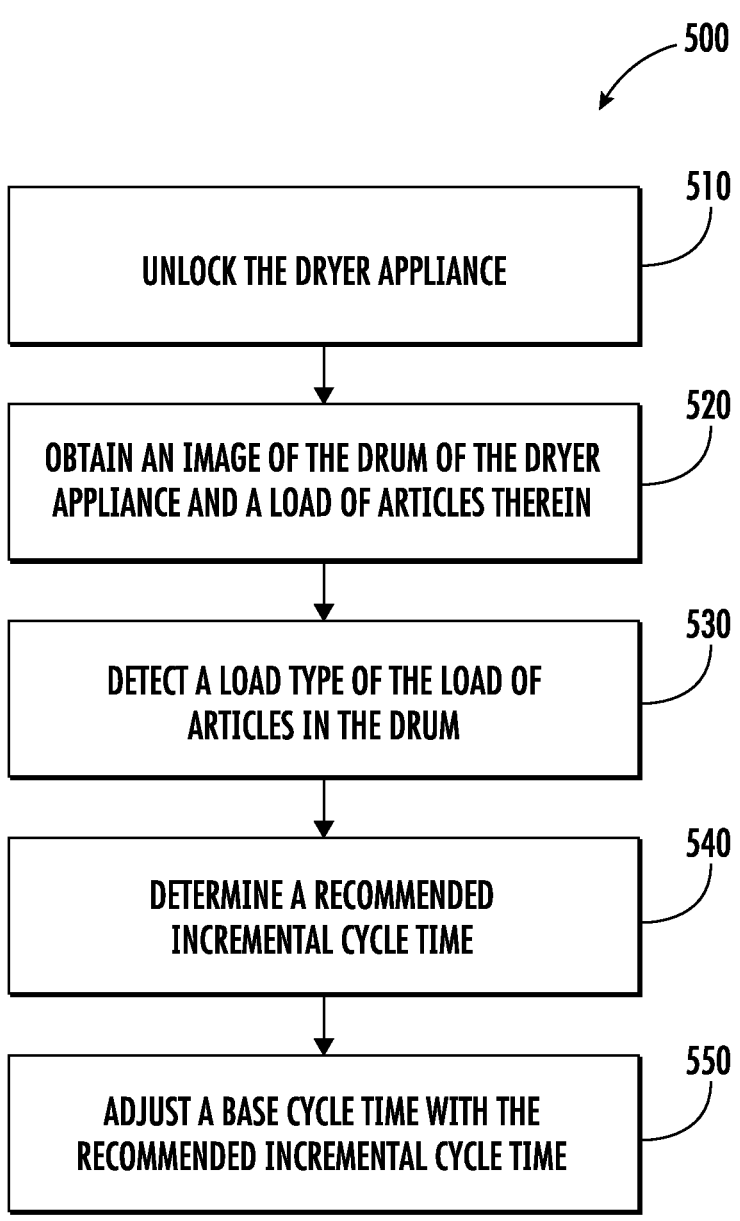
FIG. 5 provides a flow chart illustration of an exemplary method of operating a dryer appliance according to one or more exemplary embodiments of the present subject matter.
Figure 6:
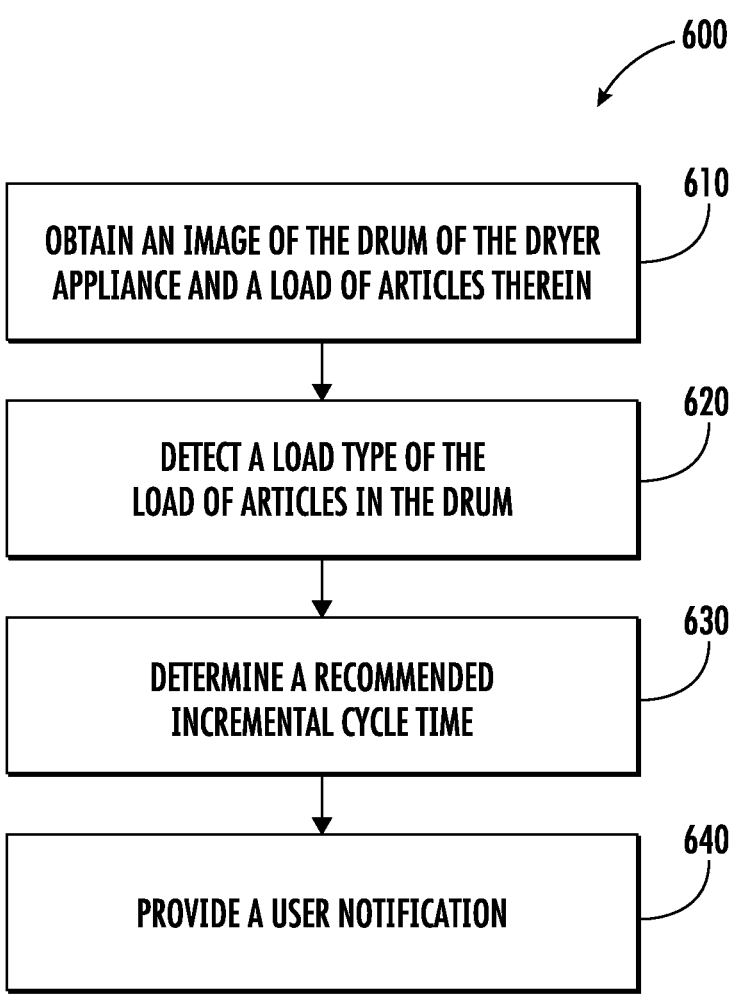
FIG. 6 provides a flow chart illustration of another exemplary method of operating a dryer appliance according to one or more additional exemplary embodiments of the present subject matter.

As illustrated in FIGS. 5 and 6, embodiments of the present disclosure also include methods of operating a dryer appliance. It should be appreciated that such methods may be used to operate any suitable dryer appliance. For example, such methods may be utilized to operate dryer 10 of FIGS. 1 and 2, or other dryer appliances. Controller 84 of dryer appliance 10 may be programmed to implement such methods, e.g., controller 84 is capable of and may be operable to perform any methods and associated method steps as disclosed herein. In some embodiments, the controller 84 may perform method steps in combination with one or more remote computing devices, such as a remote database or remote processor or one or more other remote computing devices, e.g., in a distributed computing environment such as the cloud, the fog, and/or the edge. Thus, references herein to a "remote computing device" include at least one such device with which a dryer appliance and/or remote user interface device communicates, e.g., over the internet, such as one or more remote computing devices in the cloud, etc. In such embodiments, the controller 84 may communicate with such remote computing device or devices via the internet, among other possible communications means. For example, some embodiments of the methods disclosed herein may include distributed computing whereby certain steps or calculations/determinations are performed locally, e.g., by the controller 84 onboard the dryer appliance 10, while other steps or calculations/determinations are performed by a remote computing device with which the controller 84 communicates, e.g., via the internet.

Turning now specifically to FIG. 5, in some embodiments, the method 500 may include a step 510 of unlocking the dryer appliance. In some embodiments unlocking the dryer appliance may include unlocking one or more user interfaces of the dryer appliance, such as a remote user interface, e.g., a smartphone app, and/or a local user interface such as control panel 81. For example, unlocking the user interface may include permitting the dryer appliance, e.g., the controller 84 thereof, to active the dryer appliance in response to a user input received at the user interface, e.g., at control panel 81.

In some embodiments, method 500 may further include a step 520 of obtaining an image of a drum of the dryer appliance and a load of articles therein. The image may be obtained, for example, by a remote user interface device, and such image captured may be guided, e.g., using a reticle displayed on the remote user interface device, such as described above. Thus, in some embodiments, the step 520 may further include displaying, on a display of the remote user interface device, the reticle configured to align with the dryer appliance. In some embodiments, displaying the reticle may include overlaying the reticle on a live image of the dryer appliance. For example, the remote user interface device may include a camera, such as a smartphone or tablet computer including a camera, as is recognized by those of ordinary skill in the art. Further, in some embodiments, the reticle may more particularly be configured to align with an opening of the drum of the dryer appliance. For example, the image may be obtained while the reticle is aligned with the drum in the live image on the display of the remote user interface device. The image which is obtained may include the load of articles and surrounding portions of the chamber, such that the load type of the load of articles may be discerned in the image, e.g., by image processing.

In addition, the method 500 may further include a step 530 of detecting a load type of the load of articles in the drum. As should be appreciated, in some embodiments the load type detected is based on the image obtained, e.g., the image obtained at step 520. In particular, as described above, the image obtained may include the load of articles such that the load type of the load of articles may be discerned in the image. Thus, detecting the load type may include performing image analysis on the image of the load of articles in the drum of the dryer appliance. More particularly, in some embodiments, the image analysis may be performed by an image recognition process, such as a R-CNN as described above, on the image of the load of articles in the drum.

The load type detected may refer to a categorization of the load of articles within the dryer appliance. As will be described in more detail below, the load type detected may be used to determine a recommended incremental cycle time that may adjust a previously selected base cycle time. As such, the load type detected may be used to determine an adjusted cycle time, e.g., a cycle time that includes the base cycle time adjusted with the recommended incremental cycle time, that may optimally dry the load of articles within the dryer appliance.

For example, in some embodiments, the load type detected may be the type of articles within the load of articles, e.g., based on weight, absorbency, and/or material type, etc., of the articles. In such embodiments, the load type detected may be a load of towels, a load of shirts, a load of pants, or any other suitable type of articles. In another embodiment, the load type detected may be the type of fabric of the load of articles. For example, in such embodiments, the detected load type may be a load of cotton articles, a load of polyester articles, a load of wool articles, or any other suitable type of fabric. In yet another embodiment, the load of articles within the dryer appliance may include a plurality of articles that each may have a different type, fabric, or any other suitable categorization of the articles. In such instances, the load type detected may indicate a mixed load of articles.

It should be appreciated that the load types detected as described above are provided by way of example only, and in alternative exemplary embodiments, any suitable categorization of the load of articles may be detected as the load type.

In addition, the method 500 may include a step 540 of determining the recommended incremental cycle time. In some embodiments, a user may select a base cycle time, e.g., via input selector 80, of a dry cycle of the dryer appliance. In some instances, the load of articles may require a cycle time that differs from the base cycle time selected. For example, in some instances the load type, e.g., as detected by step 530, of the load of articles may require a cycle time that is greater than the base cycle time selected, such as when the base cycle time does not include adequate time to fully dry the load of articles. In addition, in some instances the load type, e.g., as detected by step 530, of the load of articles may require a cycle time that is shorter than the base cycle time selected, such as when the base cycle time includes too much time that may cause overheating of the load of articles. In general, the recommended incremental cycle time may be any suitable amount of time that may adjust the base cycle time such that the dry cycle may optimally dry the load of articles. In some embodiments, the recommended incremental cycle time may be based on data stored in the memory or memory devices of a controller, e.g., controller 84.

In some embodiments, the method 500 may further comprise a step of providing a user notification in response to the determined recommended incremental cycle time, e.g., as determined at step 540. The user notification may be provided on the remote user interface device, such as on a display of the remote user interface device. Moreover, the user notification may include a prompt to adjust the base cycle time with the recommended incremental cycle time.

In addition, the method 500 may include a step 550 of adjusting the base cycle time with the recommended incremental cycle time. As briefly mentioned above, the recommended incremental cycle time may adjust a base cycle time such that the dry cycle may optimally dry the load of articles. For example, the recommended incremental cycle time may adjust the base cycle time by being added thereto, such as when the base cycle time is too short to fully dry a load of articles. In another example, the recommended incremental cycle time may adjust the base cycle time by being subtracted therefrom, such as when the base cycle time is too long and may overheat the load of articles.

It should be appreciated that the adjustments as described above are provided by way of example only, and in alternative exemplary embodiments, the recommended incremental cycle time may adjust the base cycle time in any suitable manner.

In addition, in some embodiments, the method 500 may further include calculating an adjusted cycle time from the base cycle time and the recommended incremental cycle time. It should be appreciated that calculating the adjusted cycle time may be in response to adjusting the base cycle time, such as described above.

Further, the method 500 may include activating the dryer appliance. In addition, in some embodiments, the dryer appliance may receive an input. In such embodiments, the dryer appliance may be activated in response to the input received. Moreover, in some embodiments, activating the dryer appliance may include performing a dry cycle of the dryer appliance for the adjusted cycle time, e.g., where the dry cycle duration is the adjusted cycle time in that the dry cycle runs concurrently with the adjusted cycle time and the dry cycle is terminated when the adjusted cycle time elapses. As such, the dryer appliance may perform the dry cycle of the dryer appliance for a time that may optimally dry the load of articles therein.

More particularly, activating the dryer appliance may include causing at least one mechanical component of the dryer appliance to be operated. For example, the mechanical component may be a motor, such as the motor 38 of the exemplary dryer appliance illustrated in FIG. 2. In addition, the mechanical component may be a fan, a heating element, a pump, a compressor, or a valve, among other possible example mechanical components of a dryer appliance. Further, operating the mechanical component may include changing a physical status of the component, e.g., a speed, position, etc. of the component, such as accelerating the motor, fan, etc., e.g., from a zero starting speed, opening a valve, and/or other changes in the physical state of one or more mechanical components of the dryer appliance.

Additionally, exemplary embodiments of the present disclosure also include methods of operating a dryer appliance such as method 600 illustrated in FIG. 6. Such methods may include a step 610 of obtaining an image of a drum of the dryer appliance and a load of articles therein. The image may be obtained, for example, by a remote user interface device, and such image captured may be guided, e.g., using a reticle displayed on the remote user interface device, such as described above. Thus, in some embodiments, the step 610 may further include displaying, on a display of the remote user interface device, the reticle configured to align with the dryer appliance. In some embodiments, displaying the reticle may include overlaying the reticle on a live image of the dryer appliance. For example, the remote user interface device may include a camera, such as a smartphone or tablet computer including a camera, as is recognized by those of ordinary skill in the art. Further, in some embodiments, the reticle may more particularly be configured to align with an opening of the drum of the dryer appliance. For example, the image may be obtained while the reticle is aligned with the drum in the live image on the display of the remote user interface device. The image which is obtained may include the load of articles and surrounding portions of the chamber, such that the load type of the load of articles may be discerned in the image, e.g., by image processing.

Further, the method 600 may include a step 620 detecting a load type of the load of articles in the drum. As should be appreciated, in some embodiments the load type detected is based on the image obtained, e.g., the image obtained at step 610. In particular, as described above, the image obtained may include the load of articles such that the load type of the load of articles may be discerned in the image. Thus, detecting the load type may include performing image analysis on the image of the load of articles in the drum of the dryer appliance. More particularly, in some embodiments, the image analysis may be performed by an image recognition process, such as a R-CNN as described above, on the image of the load of articles in the drum.

The load type detected may refer to a categorization of the load of articles within the dryer appliance. As will be described in more detail below, the load type detected may be used to determine a recommended incremental cycle time that may adjust a previously selected base cycle time. As such, the load type detected may be used to determine an adjusted cycle time, e.g., a cycle time that includes the base cycle time adjusted with the recommended incremental cycle time, that may optimally dry the load of articles within the dryer appliance.

For example, in some embodiments, the load type detected may be the type of articles within the load of articles. In such embodiments, the load type detected may be a load of towels, a load of shirts, a load of pants, or any other suitable type of articles. In another embodiment, the load type detected may be the type of fabric of the load of articles. For example, in such embodiments, the detected load type may be a load of cotton articles, a load of polyester articles, a load of wool articles, or any other suitable type of fabric. In yet another embodiment, the load of articles within the dryer appliance may include a plurality of articles that each may have a different type, fabric, or any other suitable categorization of the articles. In such instances, the load type detected may indicate a mixed load of articles, and an optimal or recommended cycle time for the mixed load of articles may be an intermediate value or composite value, e.g., average or weighted average, of the recommended cycle times for two or more load types. For example, if a load contains cotton articles mixed with synthetic articles, the load type for such load may be a mixed load of articles, and the recommended cycle time may be an intermediate value between a recommended cycle time for a cotton load and a recommended cycle time for a synthetic load, e.g., an average of the two cycle times such as a weighted average based on the proportion of articles of each type in the load.

It should be appreciated that the load types detected as described above are provided by way of example only, and in alternative exemplary embodiments, any suitable categorization of the load of articles may be detected as the load type.

As described above, in some instances, the load type of the load of articles may require a cycle time that differs from a base cycle time selected. As such, a recommended cycle time may be determined that may be used to adjust the base cycle time to optimally dry the load of articles. Thus, in some embodiments, the method 600 may further include a step 630 of determining a recommended incremental cycle time to adjust a base cycle time of a dry cycle of the dryer appliance. In general, the recommended incremental cycle time may be any suitable amount of time that may adjust the base cycle time such that the dry cycle may more optimally dry the load of articles, such as the adjusted cycle time may more completely dry the load of articles, e.g., provide a lower remaining moisture content at the completion of the dry cycle, than a dry cycle using only the base cycle time, e.g., in instances where the adjusted cycle time includes adding the recommended incremental cycle time to the base cycle time. In some embodiments, the recommended incremental cycle time may be based on data stored in the memory or memory devices of a controller, e.g., controller 84.

As illustrated in FIG. 6, the method 600 may include a step 640 of providing a user notification on the remote user interface device in response to the recommended incremental cycle time being determined. In addition, the user notification may include a prompt to adjust the base cycle time with the recommended incremental cycle time. In some embodiments, providing the prompt or input field may be a computer-implemented step. For example, in some embodiments, the prompt or input field may be provided on a display, such as a touchscreen display, of a remote user interface device. For example, the prompt may be displayed on a display, e.g., display 1002, of a remote user interface device via a text elements, e.g., text element 1010, in an overlay on an image of the dryer appliance, e.g., as described above. It should be appreciated that an affirmative action to the prompt may adjust the base cycle time with the recommended incremental cycle time to the base cycle time.

Thus, in some embodiments, the method 600 may further include calculating an adjusted cycle time from the base cycle time and the recommended incremental cycle time. It should be appreciated that calculating the adjusted cycle time may be in response to an affirmative action to the prompt. For example, calculating the adjusted cycle time may include adding the recommended incremental cycle time to the base cycle time in response to an affirmative action to the prompt. In another example, calculating the adjusted cycle time may include subtracting the recommended incremental cycle time from the base cycle time in response to an affirmative action to the prompt.

Further, the method 600 may include activating the dryer appliance. In addition, in some embodiments, the dryer appliance may receive an input. In such embodiments, the dryer appliance may be activated in response to the input received. Moreover, in some embodiments, activating the dryer appliance may include performing a dry cycle of the dryer appliance for the adjusted cycle time. As such, the dryer appliance may perform the dry cycle of the dryer appliance for a time that may optimally dry the load of articles therein and/or may dry the load of articles more optimally than a dry cycle performed for the base cycle time.

More particularly, activating the dryer appliance may include causing at least one mechanical component of the dryer appliance to be operated. For example, the mechanical component may be a motor, such as the motor 38 of the exemplary dryer appliance illustrated in FIG. 2. In addition, the mechanical component may be a fan, a heating element, a pump, a compressor, or a valve, among other possible example mechanical components of a dryer appliance. Further, operating the mechanical component may include changing a physical status of the component, e.g., a speed, position, etc. of the component, such as accelerating the motor, fan, etc., e.g., from a zero starting speed, opening a valve, and/or other changes in the physical state of one or more mechanical components of the dryer appliance.

The several embodiments of the present disclosure provide numerous advantages. For example, but without limitation, the exemplary methods of operating a dryer appliance may promote a more efficient and effective operation of the dryer appliance, such as by ensuring proper cycle time of a dry cycle of the dryer appliance. The proper cycle time may be capable of fully drying the load of articles within the dryer appliance, e.g., to about ten percent remaining moisture content or less, and may reduce or avoid instances of over drying, such as the proper cycle time may include minimal or no operating time of the dryer appliance after the load of articles are fully dried. As another example, the exemplary methods may provide an improved user interface for operating a dryer appliance, such as a more informative user interface which provides additional information about the dryer appliance, dry cycle thereof, and/or a load of articles therein, e.g., a user interface which provides load type information, rather than relying on user-selected load type. Such improved user interfaces may include interactive features, may be provided on a remote user interface device such as a smartphone or tablet computer, and may further include features for operating the dryer appliance, such as controlling or initiating a dry cycle from the user interface, as well as features for optimizing a dry cycle of the dryer appliance in response to information, e.g., load type, about the load of articles in the dryer appliance. Accordingly, a method of operating a dryer appliance using a user interface, e.g., on a remote user interface device, according to the present disclosure, such as determining a load type using image analysis as described above, provides an improved user interface, such as a user interface which is more intuitive and seamless and promotes ease of optimizing a cycle time, such as determining a more accurate cycle time for a given load of articles.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a dryer appliance, the method comprising:
   obtaining, by a remote user interface device, an image of a drum of the dryer appliance and a load of articles therein, wherein obtaining the image of the drum comprises displaying, on a display of the remote user interface device, a reticle configured to align with the dryer appliance;
   detecting, based on the image, a load type of the load of articles in the drum;
   determining a recommended incremental cycle time; and
   adjusting a base cycle time with the recommended incremental cycle time.

2. The method of claim 1 further comprising:
   calculating, in response to adjusting the base cycle time, an adjusted cycle time from the base cycle time and the recommended incremental cycle time, and activating the dryer appliance, wherein activating the dryer appliance comprises performing a dry cycle of the dryer appliance for the adjusted cycle time.

3. The method of claim 2, wherein the dryer appliance receives an input, and wherein the dryer appliance is activated in response to the input received.

4. The method of claim 1, wherein displaying the reticle comprises overlaying the reticle on a live image of the dryer appliance, wherein the image is obtained while the reticle is aligned with the drum in the live image on the display of the remote user interface device.

5. The method of claim 4, wherein the reticle is configured to align with an opening of the drum.

6. The method of claim 1, wherein detecting the load type comprises performing image analysis on the image of the load of articles in the drum.

7. The method of claim 6, wherein the image analysis is based on a region-based convolutional neural network.

8. The method of claim 1, further comprising providing a user notification on the remote user interface device in response to the determined recommended incremental cycle time, wherein the user notification comprises a prompt to adjust the base cycle time with the recommended incremental cycle time.

9. A method of operating a dryer appliance, the method comprising:
   obtaining, by a remote user interface device, an image of a drum of the dryer appliance and a load of articles therein, wherein obtaining the image of the drum comprises displaying, on a display of the remote user interface device, a reticle configured to align with the dryer appliance;
   detecting, based on the image, a load type of the load of articles in the drum;
   determining, based on the load type, a recommended incremental cycle time to adjust a base cycle time of a dry cycle of the dryer appliance; and
   providing a user notification on the remote user interface device in response to the recommended incremental cycle time being determined.

10. The method of claim 9, wherein the user notification comprises a prompt to adjust the base cycle time with the recommended incremental cycle time.

11. The method of claim 10, further comprising adding the recommended incremental cycle time to the base cycle time in response to an affirmative action to the prompt.

12. The method of claim 10, further comprising subtracting the recommended incremental cycle time from the base cycle time in response to an affirmative action to the prompt.

13. The method of claim 10, further comprising, in response to an affirmative action to the prompt, calculating an adjusted cycle time from the base cycle time and the recommended incremental cycle time, and activating the dryer appliance, wherein activating the dryer appliance comprises performing a dry cycle of the dryer appliance for the adjusted cycle time.

14. The method of claim 13, further comprising receiving, by the dryer appliance, an input, and wherein activating the dryer appliance is in response to the input received.

15. The method of claim 9, wherein displaying the reticle comprises overlaying the reticle on a live image of the dryer appliance, wherein the image is obtained while the reticle is aligned with the drum in the live image on the display of the remote user interface device.

16. The method of claim 15, wherein the reticle is configured to align with an opening of the drum.

17. The method of claim 9, wherein detecting the load type comprises performing image analysis on the image of the load of articles in the drum.

18. The method of claim 17, wherein the image analysis is based on a region-based convolutional neural network.

* * * * *